UNITED STATES PATENT OFFICE.

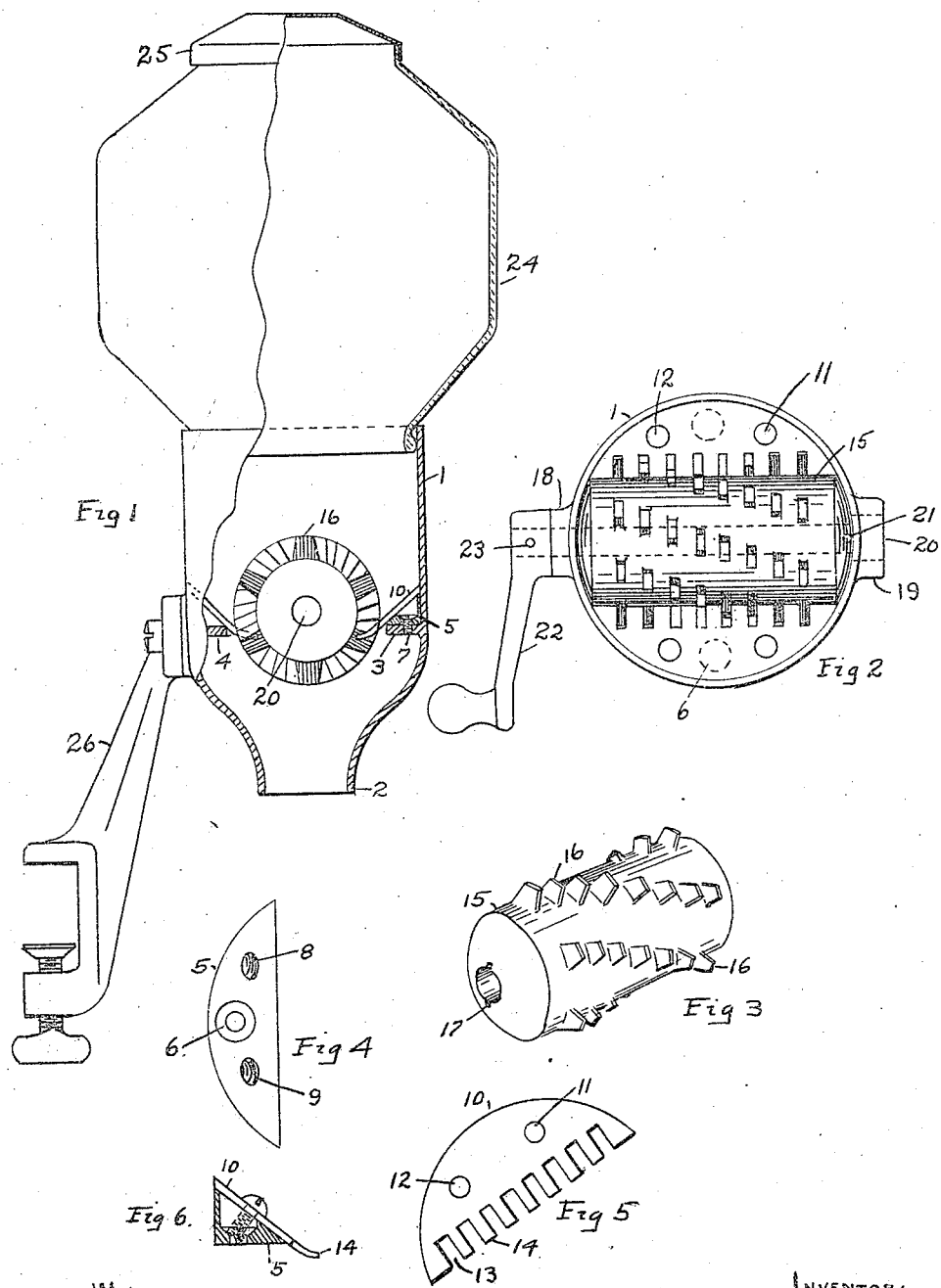

LOUIS J. MONAHAN, OF OSHKOSH, WISCONSIN.

NUT-CUTTING MACHINE.

1,150,219.  Specification of Letters Patent.  Patented Aug. 17, 1915.

Application filed April 5, 1915. Serial No. 19,136.

*To all whom it may concern:*

Be it known that I, LOUIS J. MONAHAN, citizen of the United States, residing at Oshkosh, in the county of Winnebago and State of Wisconsin, have invented certain new and useful Improvements in Nut-Cutting Machines, of which the following is a specification.

The invention relates to a new and useful nut cutting machine and has for its object the provision and arrangement of parts to effect a most desirable machine for attaching to soda fountains and the like where ground up nut kernels are used.

A further object is to provide a convenient device that can be easily attached to soda fountains or counters for immediate use of operatives thereof and to form an attractive attachment thereon.

A further object is to provide a machine that will carry a supply of nut kernels and grind or cut them up finely as needed for serving to enable them to be dispensed in a fresh state.

A further object is to arrange the working parts of such a machine that the nut kernels will be ground or cut up without pressing the oil content therefrom.

In the drawing Figure 1 is a side elevation of the machine showing part in section; Fig. 2 a top view looking down into same; Fig. 3 a perspective detail of the revoluble cutter bar; Fig. 4 a detail of the supporting saddle; Fig. 5 a plan view of the stationary cutter and Fig. 6 a detail sectional view showing the saddle and cutter attached together.

The machine is designed to be economically manufactured and at the same time produce an ornamental attachment because of being used at all times in public view and consists of a highly finished or plated metal body 1 of cylindrical form and being brought down to a small mouth, 2 at the lower end, the said lower end being brought down approximately cylindrical to direct the material in a straight downward path when issuing therefrom. Formed with the body and extending horizontally and inwardly therefrom are two shelves, 3 and 4 which are machined on their top face while boring out the body. Secured on top of each of the shelves is a saddle, 5, shown in detail in Fig. 4 preferably a die casting having an attaching screw hole 6 formed therein through which a flat headed screw 7 is passed and tapped into the shelves 3 and 4, which holds the saddles firmly in place, the back of the saddle being curved to fit the bore of the body. The saddle has a tapering top face slanting downward when in position as shown. Two threaded holes 8 and 9 are tapped into the saddles to receive screw bolts. On top of the saddles are secured stationary cutters 10 shown in Fig. 5 in detail which are formed by punching from sheet metal about 1/16" in thickness and has two holes 11 and 12 spaced to conform with the saddle holes 8 and 9. The back is rounded and beveled to fit tightly against the inner walls of the body and the front edges has a series of spaces 13 formed therein leaving teeth 14. The stationary cutters are secured to the saddles by means of round headed machine screws after the saddle is in place; Fig. 6 shows these parts secured together and Fig. 1 shows the parts in position. The stationary cutters when in position slant downward and the ends of the teeth are bent slightly upward as shown to give the desired cutting action.

A revoluble cutter bar shown in Fig. 3 is provided and consists of a solid metal cylindrical body 15 having a plurality of radially extending teeth 16 spaced over its surface, the teeth are formed spirally along its surface to give a continuous cut. The mode of construction is to cast the blanks with spiral ribs along the surface and then cut grooves circumferentially therearound leaving the teeth 16 as shown. A hole is drilled axially through the body and has a slot 17 across one end to form a key seat for driving the cutter. The ends of the cutter bar are turned rounding of the same radius as the bore of the body 1 so it will fit snugly therein as shown in Fig. 2. The teeth 16 are so spaced that they will pass between the teeth 14 of the stationary cutters when the parts are assembled.

The body 1 has hubs 18 and 19 formed therewith which is drilled to receive a shaft 20. This shaft is fitted through the cutter bar and journals in the hubs 18 and 19, one end being of larger diameter as shown in hub 19 and a small pin 21 is fitted just inside the large portion of the shaft which slips into the slot 17 of the cutter bar, the other end of the shaft extends out through the hub 18 and has a suitable handle 22 fitted thereon and secured by a taper pin 23. Thus by turning the handle, the cutter bar is caused to revolve therewith, the teeth 16 passing between the teeth 14 of the stationary cutter.

A glass hopper 24 is fitted in the top opening of the body 1 to hold a supply of material and has a cover 25 fitted thereon.

For supporting the machine, a bracket 26 is attached to the body and has a clamp jaw of suitable form for clamping to a table, slab or bar.

In operation, the machine is securely mounted allowing the exit mouth 2 to extend over the edge and the hopper is filled with nut kernels.

When ground nuts are wanted the receptacle is held under the mouth 2 and the handle 22 given one or more turns or simply rocked back and forth and the ground nuts immediately flow into the receptacle in freshly cut condition, being chopped or punched between the teeth without any squeezing pressure being exerted thereon.

The stationary cutters slanting downward cause all of the contents to flow onto the cutter bar and the bent up ends of the teeth 14 give the desired shearing effect.

The rounded ends of the cutter bar just fit into the bowl and prevent any material passing through at these points and forms a simple form of construction.

What I claim is:—

1. A nut cutting machine comprising a cylindrical casing having a plurality of teeth disposed therewithin and positioned to slant downwardly, a cylindrical toothed cutter bar extending transversely of the casing and having its teeth adapted to pass between the teeth within the casing, the said cutter bar having its ends formed as spherical surfaces.

2. A nut cutting machine comprising a casing having a converged outlet and shelves formed therein, saddles secured on the shelves and having their top surfaces adapted to slant downwardly, toothed plates secured on the saddles, a toothed cutter bar extending transversely of the casing having its teeth positioned to pass between the teeth of the plates during its rotation.

3. A nut cutting machine comprising a cylindrical casing having a plurality of teeth extending therewithin, a cylindrical toothed cutter bar extending transversely of the casing and having its teeth adapted to pass between the teeth within the casing, the said cutter bar having its ends formed as spherical surfaces.

4. In a nut cutting machine the combination with a casing having a converged discharge outlet and shelves formed therein, toothed plates secured to the shelves, a cylindrical toothed cutter bar extending transversely of the casing and having its ends rounded to conform with the bore of the casing and having its teeth positioned to pass between the teeth of the plates within the casing during the rotation of said cutter bar.

In testimony whereof I affix my signature, in the presence of two witnesses.

LOUIS J. MONAHAN.

Witnesses:
   Geo. J. Eigner,
   Helen Knipfer.